(No Model.) 2 Sheets—Sheet 2.
W. G. FINLAY.
EXPANDING PULLEY.
No. 414,508. Patented Nov. 5, 1889.
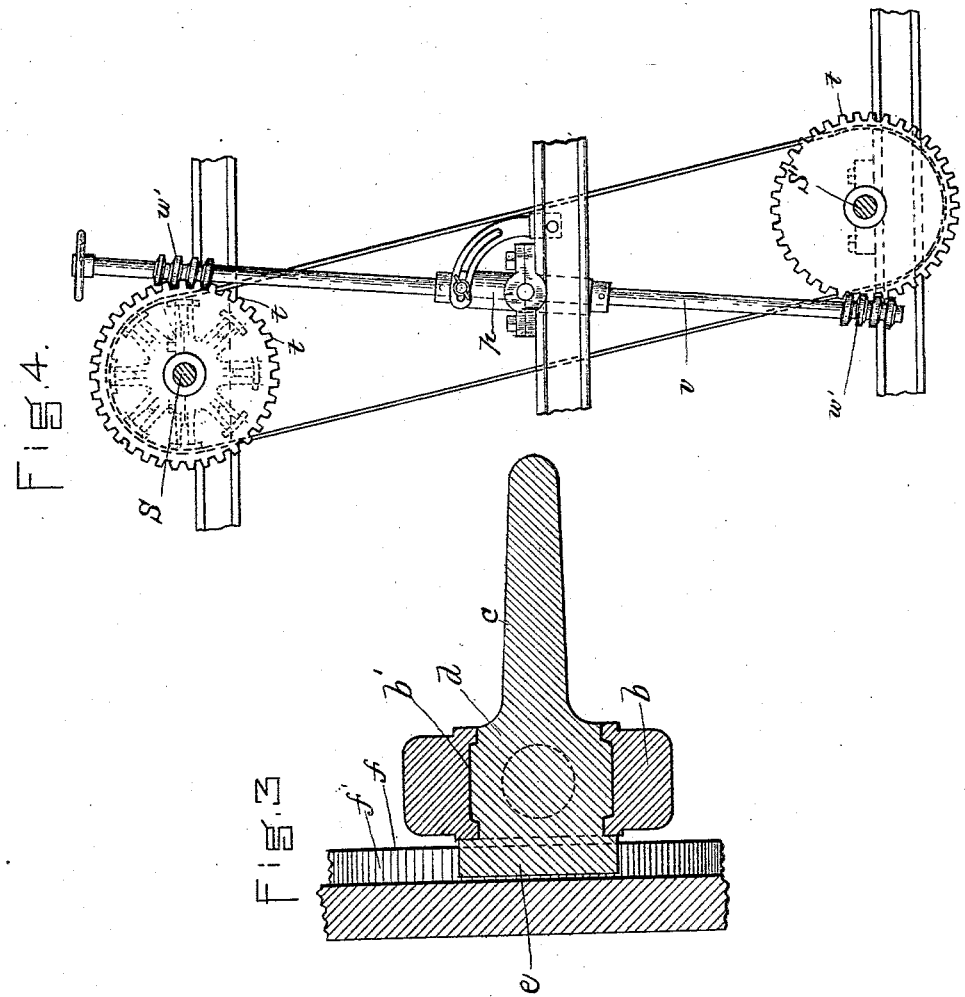

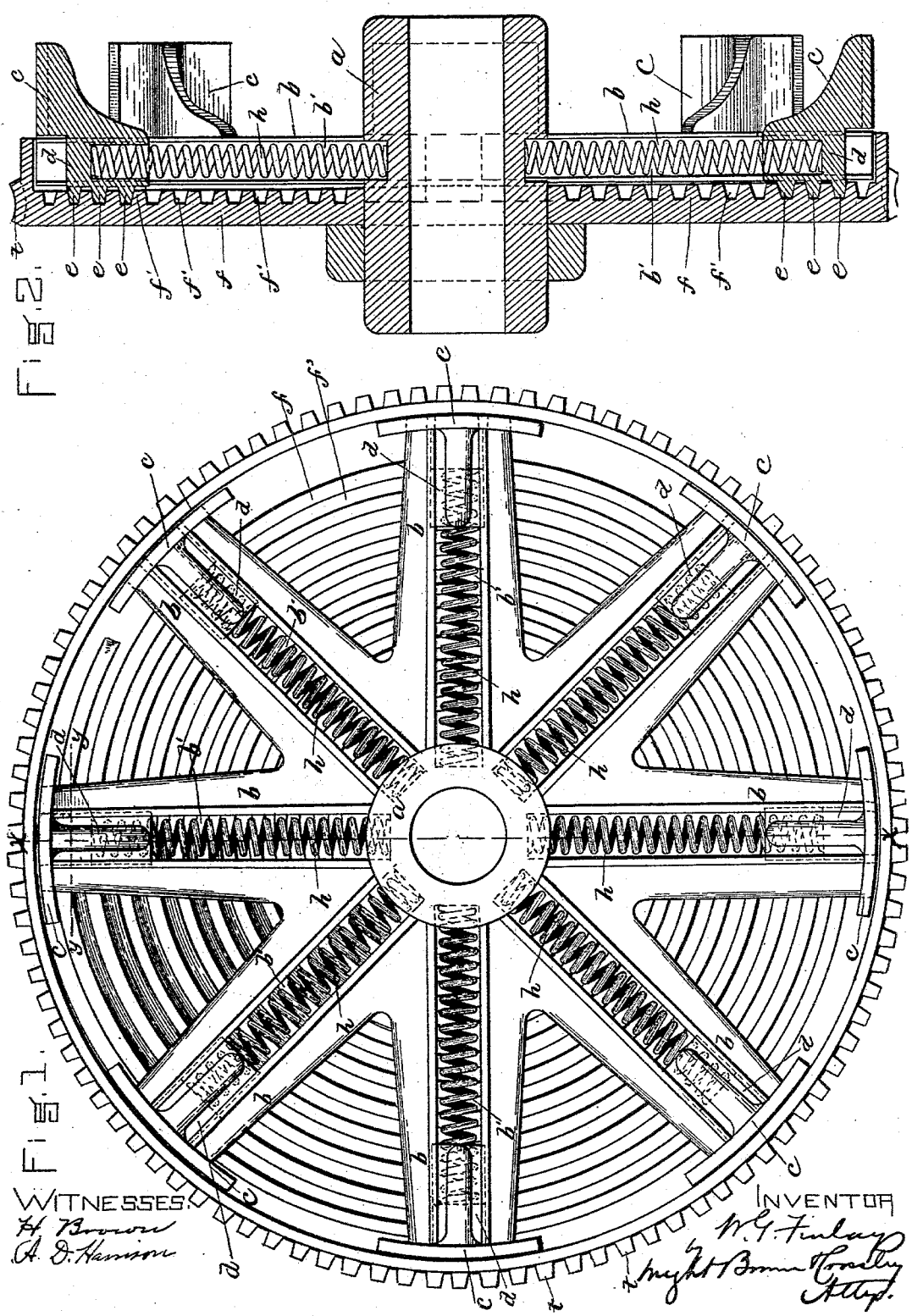

UNITED STATES PATENT OFFICE.

WILLIAM G. FINLAY, OF LAWRENCE, MASSACHUSETTS.

EXPANDING PULLEY.

SPECIFICATION forming part of Letters Patent No. 414,508, dated November 5, 1889.

Application filed February 23, 1889. Serial No. 300,897. (No model.)

*To all whom it may concern:*

Be it known that I, WILLIAM G. FINLAY, of Lawrence, in the county of Essex and State of Massachusetts, have invented certain new and useful Improvements in Expanding Pulleys, of which the following is a specification.

This invention has for its object to provide an expanding pulley of simple construction adapted to be readily expanded and contracted and to be retained at any desired adjustment by the means used to effect the adjustment.

To these ends the invention consists in the improvements which I will now proceed to describe and claim.

Of the accompanying drawings, forming a part of this specification, Figure 1 represents a side view of a pulley provided with my improvements, the pulley-supporting plates or sections being expanded. Fig. 2 represents a section on line $x\ x$ of Fig. 1. Fig. 3 represents a section on line $y\ y$ of Fig. 1. Fig. 4 represents a side view of a portion of a paper-cutting machine having my improvement.

The same letters of reference indicate the same parts in all the figures.

In the drawings, $a$ represents the hub of the pulley, on which are formed a series of radial arms or spokes $b\ b\ b$, provided with longitudinal slots or guides $b'$, which also radiate from the hub.

$c\ c\ c$ represent the belt-supporting plates or sections, each of which is preferably curved longitudinally, as shown. Said plates are attached to or formed on slides $d\ d\ d$, which are fitted to move in the slots or guides $b'$, and are provided with rack-teeth $e$ on their rear sides.
$f$ represents a circular plate, which is mounted to rotate independently on the hub $a$, and is provided on one side with a volute tooth or rib $f'$, which extends from the periphery of the said plate to or nearly to the hub, and is engaged with the teeth $e$ on the plate-slides $d$, said teeth being formed to fit the curvature of the volute tooth or rib $f'$. For convenience I will call the plate $f$, with its volute tooth or rib, a "scroll." It will be seen that the engagement of the scroll with the slides $d$ enables said scroll to move the slides $d$ simultaneously toward or from the hub $a$ when said scroll is rotated and to hold the slides at any position to which they may be thus moved. The belt-supporting plates $c$ may be therefore adjusted to and held at any desired distance from the hub $a$, so that the diameter of the pulley-periphery, which said plates collectively form, may be increased by rotating the scroll in one direction and decreased by rotating it in the opposite direction. The frictional contact of the slide-teeth $e$ with the volute tooth $f'$ is usually sufficient to prevent rattling or accidental rotation of the scroll or plate $f$; but to increase said friction, and thereby prevent the possibility of rattling, I interpose springs $h$ between the hub $a$ and the inner ends of the slides $d$, said springs exerting outward pressure on the slides $d$. The hub $a$ and slides $d$ are provided with sockets receiving the ends of the springs $h$. The scroll $f$ may be rotated to effect the described adjustment of the belt-supporting sections by hand or by any suitable mechanism. I have here shown the periphery of said scroll provided with gear-teeth $t$, formed to engage a worm on a shaft $v$, Fig. 4. Said shaft is journaled in a pivoted box $p$, and is provided with two worms $w\ w'$, one engaged with the upper portion of the scroll of an expanding pulley on a shaft S and the other with the scroll of a duplicate pulley on another shaft S', so that the rotation of said shaft $v$ will rotate the two pulleys in opposite directions, and therefore expand one and contract the other. The pivoted box enables the shaft $v$ to be moved to throw the two worms $w\ w'$ simultaneously into and out of engagement with the two pulleys.

The arrangement of parts last described is applicable to the paper-cutting machine shown in Letters Patent No. 326,859, granted to me September 22, 1885, the simultaneous expansion of one pulley and the contraction of the other pulley being for the purpose of regulating the length of the sheets into which a web of paper is cut by said machine.

The improved expanding pulley forming the subject of this application is intended as a substitute, in a paper-cutting machine, for the pulleys constructed as shown in said patent; but it is obvious that said improved pulley may be used for any other purpose to which it is applicable.

I claim—

1. In an expanding pulley, the combination of a hub having radial arms, toothed slides fitted to move radially on said arms and provided with belt-supports, an independently-rotatable plate journaled on said hub and provided with a spiral or volute rib or tooth engaged with said slides, and springs arranged to press the teeth of the slides against the said tooth or rib, as set forth.

2. In an expanding pulley, the combination of a hub having radial arms, toothed slides fitted to move radially on said arms and provided with belt-supports, an independently-rotatable plate provided at one side with a spiral or volute rib or tooth and on its periphery with teeth, and a laterally-movable shaft having a worm adapted to engage said peripheral teeth, as set forth.

In testimony whereof I have signed my name to this specification, in the presence of two subscribing witnesses, this 4th day of February, A. D. 1889.

WILLIAM G. FINLAY.

Witnesses:
C. F. BROWN,
A. D. HARRISON.